J. P. PUTNAM.
WATER SEAL TRAP.
APPLICATION FILED MAY 16, 1906.

978,485.

Patented Dec. 13, 1910.

WITNESSES:

INVENTOR.

UNITED STATES PATENT OFFICE.

JOHN PICKERING PUTNAM, OF BOSTON, MASSACHUSETTS.

WATER-SEAL TRAP.

978,485.  Specification of Letters Patent.  Patented Dec. 13, 1910.

Application filed May 16, 1906. Serial No. 317,164.

*To all whom it may concern:*

Be it known that I, JOHN PICKERING PUTNAM, of Boston, in the county of Suffolk and State of Massachusetts, have invented certain new and useful Improvements in Water-Seal Traps, of which the following is a specification.

The object of my invention is to provide a water seal trap which shall have the same principle as that which forms the subject of my prior Patent 827,324 of July 31, 1906, but which is an improvement thereon in facility of construction and application.

Figure 1:
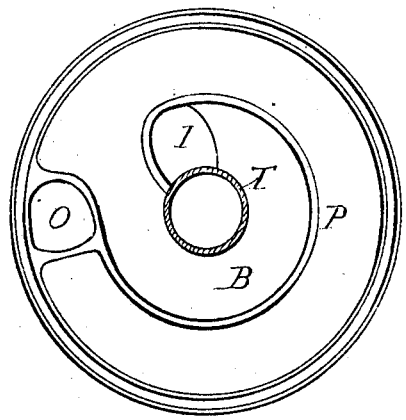
Figure 2:
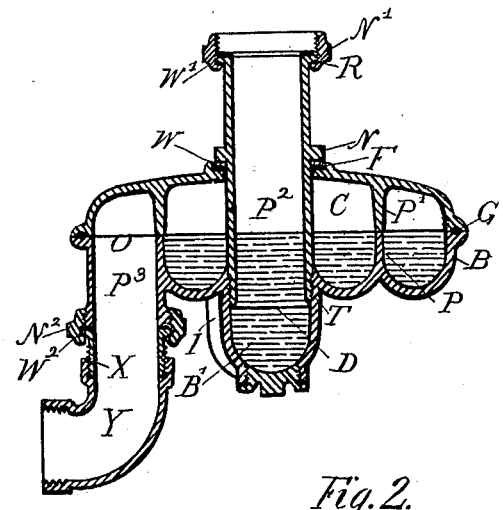
Figure 5:
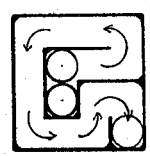
Figure 3:
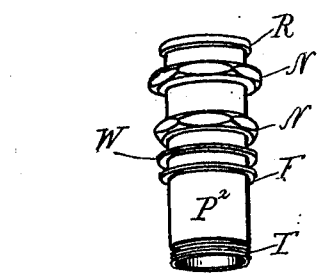
Figure 3:
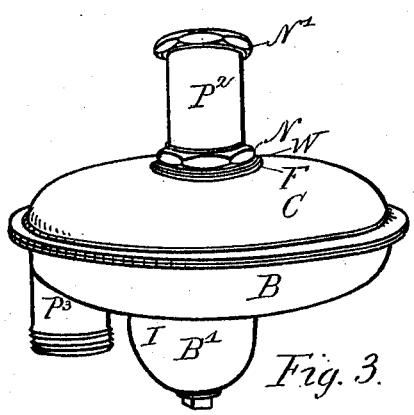
Figure 4:
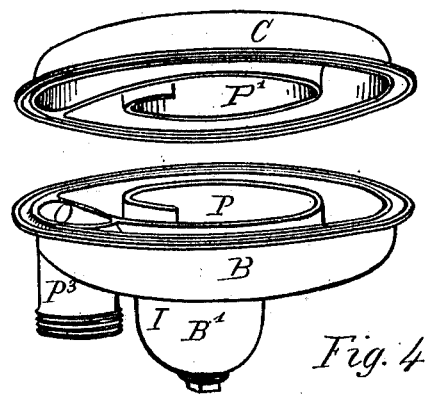

In the drawings Figure 1 is a plan and Fig. 2 a vertical section of the apparatus embodying my invention. Fig. 3 is a perspective view of the trap complete. Fig. 4 is a perspective view showing the trap opened, its cover and its inlet pipe fitted up with the means necessary for coupling the parts together. Fig. 5 is a diagram showing a modification of the form of the interior partitions.

Similar letters refer to similar parts throughout the views.

B is the body of the trap in the form of a shallow vessel having considerable horizontal extension. P, P′, is a partition, preferably spiral, set in the vessel and dividing it into a continuous spiral water way extending from the inlet mouth I of the trap to the outlet mouth O which is at one side of the trap, the inlet mouth being near the center.

C is a cover to the vessel secured to the body B by means of a male thread T on the lower end of the inlet pipe $P^2$ engaging with a female thread in the bottom of the body B at its center, and a shoulder N on the pipe $P^2$ above the cover C, the shoulder surrounding the pipe $P^2$ at such a height above the thread T that when this thread is screwed into the female thread in the bottom of the body, the shoulder shall force the cover tightly against the body, and make an air and water tight joint by compressing an elastic gasket G between the two. The cover has a central hole to admit the pipe $P^2$, and a soft packing F around the hole, compressed against the upper side of the cover C by the shoulder N, makes a tight joint at this point when the pipe $P^2$ is screwed home. A hard washer W takes the friction off the packing when the pipe $P^2$ is turned in screwing in. The gasket G sets in a groove made in the outer rim of the body B and in a corresponding groove in the cover C. The shoulder N is secured rigidly to the pipe $P^2$ and has the form of a polygonal nut to facilitate screwing the pipe home by means of a wrench.

A small shoulder ring R secured to the top of the pipe $P^2$ and a coupling nut N′ accompanying the ring serve to connect the trap to the basin or other plumbing fixture which it is intended to serve. The partition P, P′ is perpendicular and makes a continuous water way through the trap from inlet mouth I to outlet mouth O. Half of this partition is in the body and half in the cover, and the height of the partition is just equal to the depth of the body and of the cover respectively, so that when these two parts of the trap are constructed of metal castings they may be both easily fitted to each other by grinding them on a flat stone or other plane wearing surface. In this way the trap body and its partitions P may be made to exactly correspond with its cover C and partitions P′ and a perfectly fine tight joint effected between the two without any skilled labor of lathe turning.

The partition is preferably spiral, the pipe $P^2$, when it is screwed in place, forming the center around which the spiral starts. Below the lower end of this pipe $P^2$ where it screws into the bottom of the body B, is a return bend B′, forming the trap proper of the device, one end of the return bend being the connection with the lower end of the pipe $P^2$ and the other end being the inlet mouth I of the trap, the dip D of this trap being below the bottom of the trap body B, which with its cover C form the "reservoir chamber" of the device.

The outlet pipe $P^3$ is connected with the waste pipe system by means of a coupling nut $N^2$, and this nut and a lead washer $W^2$ enables the trap to be disconnected easily from the waste pipe connections X and Y. Disconnection at this point permits of easy disconnection of the top of the pipe $P^2$ from the plumbing fixture by unscrewing the upper coupling nut N′. A lead washer W′ makes this upper connection water tight.

The operation of my trap is the same in principle as in that of the device forming the subject matter of my application filed May 16th 1903 above referred to and therefore need not be described here, except to call attention to the fact that the movement of the fluids in this device takes place in a direction opposite to that in my former application.

Claims.

1. In a water trap the combination with an inlet arm and an outlet arm, of a partitioned reservoir chamber between the two divided into two parts, an upper and a lower part, by a horizontal plane cutting through both the chamber and its partitions so that either part may be finished true by rubbing on a horizontal surface, and means for making a sewer-gas tight connection between the outer walls of the two parts.

2. In a water trap having an inlet arm and an outlet arm, and a reservoir chamber between the two, the combination with the arms, of the two parts of the reservoir chamber, an upper and a lower part divided from one another by a horizontal plane; partitions in each part making a continuous water way from inlet to outlet arm and also divided by the horizontal plane, and means for making a sewer-gas tight connection between the outer walls of the two parts.

3. In a water trap the combination of an inlet arm, an outlet arm, a reservoir chamber between the arms divided into two parts by a horizontal plane, a vertical partition in each part, the partition in the upper corresponding with that in the lower part, and together forming a continuous waterway from inlet arm to outlet arm, a return bend at the bottom of the inlet arm below the reservoir chamber and connecting with it, and means for making a tight joint between the outer walls of the two parts of the chamber.

4. In a water trap the combination of a reservoir chamber divided into two parts, an upper and a lower part; a depression in the bottom of the lower part provided with a dip forming a trap; a tube forming an inlet arm passing through the reservoir chamber and detachably connected with the trap on one side of the dip; an outlet arm connected with the chamber above the trap; and means for making a sewer-gas tight connection between the outer walls of the two parts.

5. In a water trap the combination of a reservoir chamber divided into two parts, an upper and a lower part; a depression in the bottom of the lower part provided with a dip forming a trap; a tube forming an inlet arm passing through the chamber and detachably connected with the trap on one side of the dip; and an outlet arm connected with the lower part of the chamber at a point above the bottom thereof.

6. In a water trap, the combination of a reservoir chamber divided into two parts, an upper and a lower part; an inlet arm passing through the chamber and detachably connected with the lower part; means on the inlet arm for making a sewer-gas tight joint between the two parts of the chamber; and an outlet arm connected with the chamber.

7. In a water trap the combination of a reservoir chamber, divided by a partition forming a continuous water way; an inlet arm passing through the chamber; a trap at the lower end of the chamber connected with the inlet arm on one side and with the inner end of the continuous water way on the other side; and an outlet arm connecting with the outer end of the water way and opening out of the lower part of the reservoir chamber.

8. In a water trap the combination of a reservoir chamber divided by a partition forming a continuous water way; an inlet arm passing through the chamber; a trap at the lower end of the chamber connected with the inlet arm on one side and with the inner end of the water way on the other side; and an outlet arm connecting with the chamber above its bottom.

9. In a water trap the combination with an inlet arm and an outlet arm of a reservoir chamber between the two divided into two parts, an upper and a lower part; and partitions in each part corresponding with and fitting each other, and arranged to form a continuous water way between the inlet and outlet arms when the two parts of the chamber are connected together.

10. In a water trap the combination of a reservoir chamber divided into two parts, an upper and a lower part; a trap below the bottom of the lower part; a tube forming an inlet arm passing through the chamber and detachably connected with the trap by threading; and an outlet arm connecting with the chamber.

11. In a water trap the combination of a reservoir chamber divided into two parts, an upper and a lower part; an inlet tube passing through the chamber and detachably connected with the lower part by threading; means on the upper part of the tube to permit of turning the tube into the threading; and an outlet arm connected with the chamber.

12. In a water trap the combination of a reservoir chamber divided into two parts, an upper and a lower part; an inlet tube passing through the chamber and threaded into the lower part of the chamber; a shoulder on the tube above the upper part of the chamber at such a distance above the threading that when the tube is screwed into place, the shoulder shall press the two parts of the chamber together and make a tight joint between them.

13. In a water trap the combination of the upper chamber C, lower chamber B, forming together a reservoir chamber; inlet tube P² detachably connected with the lower chamber B; shoulder N on the tube above the upper chamber; soft packing F between the shoulder N and the upper chamber; and soft packing G between the outer edges of the upper and lower chambers.

14. In a water trap the combination of the upper chamber C, lower chamber B, spiral partitions P and P′ in these chambers corresponding with one another; inlet tube P² passing through the two chambers and forming the central curve of the spiral partitions; trap B′ at the bottom of the chamber into which the tube P² enters; and an outlet arm connecting with the chamber.

15. In a water trap the combination of the upper chamber C; lower chamber B; inlet tube P² passing through the two chambers and detachably threaded into the lower chamber; nut N fixed to the tube T for turning the same; washer W and packing F on tube T, and packing G between the chambers.

In testimony whereof I have affixed my signature, in presence of two witnesses.

JOHN PICKERING PUTNAM.

Witnesses:
 Thos. E. Hinch,
 Coralyn W. Lang.